(12) United States Patent
Sieferd et al.

(10) Patent No.: US 9,920,827 B1
(45) Date of Patent: Mar. 20, 2018

(54) AXLE ASSEMBLY HAVING HORIZONTAL OIL DRAIN INTEGRATED INTO COVER FLANGE

(71) Applicant: American Axle & Manufacturing, Inc., Detroit, MI (US)

(72) Inventors: Justin Sieferd, Dearborn Heights, MI (US); Ryan M. Clark, Royal Oak, MI (US); Matthew Haggard, Farmington Hills, MI (US); Randy K. Wolin, LaSalle (CA); Jeffrey L. Gerstenberger, Grand Blanc, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 0 days.

(21) Appl. No.: 15/408,479

(22) Filed: Jan. 18, 2017

(51) Int. Cl.
| | |
|---|---|
| F16H 57/04 | (2010.01) |
| F16H 48/08 | (2006.01) |
| F16H 57/037 | (2012.01) |
| F16H 57/021 | (2012.01) |
| F16H 57/029 | (2012.01) |
| F16H 57/031 | (2012.01) |

(52) U.S. Cl.
CPC ......... F16H 57/0408 (2013.01); F16H 48/08 (2013.01); F16H 57/021 (2013.01); F16H 57/029 (2013.01); F16H 57/031 (2013.01); F16H 57/037 (2013.01)

(58) Field of Classification Search
CPC ............................ F16H 57/0408; F16H 57/029
See application file for complete search history.

(56) References Cited

U.S. PATENT DOCUMENTS

| | | | |
|---|---|---|---|
| 3,893,487 A | 7/1975 | Engelking | |
| 5,107,808 A | 4/1992 | Mahn et al. | |
| 5,176,215 A | 1/1993 | Ackerman | |
| 5,655,280 A * | 8/1997 | McCommon | F01M 11/0408 29/243.518 |
| 7,241,246 B2 | 7/2007 | Beutler | |
| 7,866,231 B2 | 1/2011 | Kincaid et al. | |
| 8,499,891 B2 * | 8/2013 | Diehl | F01M 11/0408 184/1.5 |
| 8,857,293 B2 | 10/2014 | McGuire et al. | |
| 2005/0153811 A1 * | 7/2005 | Beutler | F16H 57/029 475/220 |
| 2008/0128207 A1 | 6/2008 | Wilkins | |

\* cited by examiner

*Primary Examiner* — Derek D Knight
(74) *Attorney, Agent, or Firm* — Harness, Dickey & Pierce, P.L.C.

(57) ABSTRACT

An axle assembly can include a housing, differential assembly in the housing, drain plug, cover, and gasket. The housing can include a main flange having threaded bores. A bottom threaded bore can extend through the main flange to be in fluid communication with a housing interior. The plug can include a shaft and a head. The shaft can threadably engage the drain bore. The cover can include a cover flange. The head of the drain plug can overlap the cover flange. The gasket can include a seal portion in sealing contact with the flanges, a standoff, and a fastener seal member. The shaft can extend through the standoff. The standoff can be a rigid material disposed between the flanges and can extend radially outward of the drain bore. The fastener seal member can be a resilient material in sealing contact with the standoff and the drain plug.

17 Claims, 5 Drawing Sheets

AXLE ASSEMBLY HAVING HORIZONTAL OIL DRAIN INTEGRATED INTO COVER FLANGE

FIELD

The present disclosure relates to an axle assembly having a horizontal oil drain integrated into a cover flange.

BACKGROUND

This section provides background information related to the present disclosure which is not necessarily prior art.

Axle assemblies typically include a differential disposed within a housing assembly. The differential receives input torque from an input pinion and outputs differential output torque to a pair of outputs. Typically, the housing assembly includes a main body, a gasket, and a cover pan. The main body defines a cavity wherein the differential is disposed. The main body typically has an aperture that is open to the cavity and through a side of the main body. The cover pan is mounted to the main body to cover the aperture and seal the cavity. Typically an amount of lubricating oil is disposed within the cavity to lubricate and cool the differential. Such housing assemblies can include a drain hole and drain plug for draining the oil from the cavity. Typically, in order to incorporate a drain hole into such an assembly, additional mass and/or manufacturing processes must be added such as to strengthen components and/or include additional fasteners. Accordingly, there exists a need for improved axle assembly oil drains.

SUMMARY

This section provides a general summary of the disclosure, and is not a comprehensive disclosure of its full scope or all of its features.

In one form, the present teachings provide for an axle assembly including a housing, an input member, a first output member, a second output member, a differential assembly, a drain plug, a cover body, and a gasket. The housing can define a main cavity. The housing can include a first output aperture, a second output aperture, and a main flange that defines a main aperture that is open to the main cavity. The main flange can include a plurality of threaded bores spaced about the main aperture and configured to threadably mate with a plurality of threaded fasteners. A bottom one of the threaded bores can be a drain bore that extends through the main flange to be in fluid communication with the main cavity. The input member can be rotatable relative to the housing about a first axis. The first and second output members can be supported for rotation relative to the housing about a second axis. The first output member can extend through the first output aperture. The second output member can extend through the second output aperture. The differential assembly can be disposed within the main cavity and can include a differential gear set drivingly coupled to the input member to receive rotary power therefrom and drivingly coupled to the first and second output members to output differential rotary power thereto. The drain plug can include a shaft and a head fixedly coupled to an end of the shaft and extending radially outward of the shaft. The shaft can include a threaded portion defining a plurality of threads that matingly engage the threads of the drain bore. The cover body can cover the main aperture. The cover body can include a cover flange that defines a plurality of cover bores. The cover bores can align with the plurality of threaded bores. A bottom one of the cover bores can be a bottom cover bore that is aligned with the drain bore. The shaft of the drain plug can extend through the bottom cover bore. The head of the drain plug can extend radially outward of the bottom cover bore to overlap the cover flange. The gasket can include a seal portion, a standoff member, and a fastener seal member. The seal portion can include a plurality of gasket bores that align with the plurality of threaded bores. A bottom one of the gasket bores can be a bottom gasket bore and can align with the drain bore. The seal portion can be a resilient material configured to be compressed between the main flange and the cover flange to form a seal therebetween. The standoff member can define a standoff bore aligned with the bottom gasket bore. The shaft of the drain plug can extend through the standoff bore. The standoff can be a rigid material disposed between the main flange and the cover flange and can extend radially outward of the drain bore and the bottom cover bore. The fastener seal member can be formed of a resilient material and can be in sealing contact with the standoff. The shaft of the drain plug can extend through and be in sealing contact with a central bore of the fastener seal member.

According to a further embodiment, the fastener seal member can have an outermost diameter that is less than an innermost diameter of the bottom gasket bore.

According to a further embodiment, an innermost diameter of the fastener seal member can be less than an outer diameter of the shaft of the drain plug.

According to a further embodiment, the fastener seal member can extend axially through at least a portion of the bottom cover bore.

According to a further embodiment, the fastener seal member can be in sealing contact with the head of the drain plug.

According to a further embodiment, a portion of the fastener seal member can have an annular thickness that narrows toward the outer side.

According to a further embodiment, the standoff can include a recess that is coaxial with the standoff bore, the fastener seal member being partially disposed within the recess.

According to a further embodiment, the shaft of the drain plug can include a non-threaded portion and the fastener seal member can sealingly contact the non-threaded portion of the shaft.

According to a further embodiment, the housing can define a drain well recessed from the main cavity, the drain bore extending into the well.

According to a further embodiment, the gasket can further include an annular second fastener seal member disposed axially between the head of the drain plug and the cover flange. The shaft of the drain plug can extend through a central bore of the second fastener seal member. An outermost diameter of the second fastener seal member can be radially outward of the bottom cover bore.

According to a further embodiment, the gasket can include a backbone formed of a rigid material having a thickness that is less than a thickness of the standoff, the seal portion of the gasket being overmolded to the backbone.

In another form, the present teachings further provide for an axle assembly including a housing, an input member, a first output member, a second output member, a differential assembly, a drain plug, a cover body, and a gasket. The housing can define a main cavity. The housing can include a first output aperture, a second output aperture, and a main flange that defines a main aperture that opens to the main cavity. The main flange can include a plurality of threaded bores spaced about the main aperture and configured to threadably mate with a plurality of threaded fasteners. A bottom one of the threaded bores can be a drain bore that can extend through the main flange to be in fluid communication with the main cavity. The input member can be rotatable relative to the housing about a first axis. The first and second output members can be supported for rotation relative to the housing about a second axis. The first output member can extend through the first output aperture. The second output member can extend through the second output aperture. The differential assembly can be disposed within the main cavity and can include a differential gear set drivingly coupled to the input member to receive rotary power therefrom and drivingly coupled to the first and second output members to output differential rotary power thereto. The drain plug can include a shaft and a head fixedly coupled to an end of the shaft and extending radially outward of the shaft. The shaft can include a threaded portion and a non-threaded portion. The threaded portion can define a plurality of threads that can matingly engage the threads of the drain bore. The non-threaded portion can be radially outward of the threads. The cover body can cover the main aperture and can include a cover flange that defines a plurality of cover bores. The cover bores can align with the plurality of threaded bores. A bottom one of the cover bores can be a bottom cover bore that can be aligned with the drain bore. The shaft of the drain plug can extend through the bottom cover bore. The head of the drain plug can extend radially outward of the bottom cover bore to overlap the cover flange. The gasket can include a seal portion and an annular washer. The seal portion can include a plurality of gasket bores that can align with the plurality of threaded bores. A bottom one of the gasket bores can be a bottom gasket bore and can align with the drain bore. The seal portion of the gasket can be a resilient material configured to be compressed between the main flange and the cover flange to form a seal therebetween. The annular washer can be coaxial with the bottom gasket bore. The washer can be disposed between the main flange and the cover flange and can extend radially outward of the bottom cover bore and the drain bore. The washer can be a material that is more rigid than the seal portion and more ductile than the drain plug. The washer can be in sealing contact with the non-threaded portion of the drain plug and the main flange.

According to a further embodiment, the washer can have an inner diameter that is less than a diameter of the non-threaded portion of the drain plug.

According to a further embodiment, the non-threaded portion of the drain plug can be tapered from a first diameter proximate to the threaded portion to a second diameter proximate to the head. The second diameter can be greater than the first diameter. The first diameter can be less than an inner diameter of the washer and the second diameter can be greater than the inner diameter of the washer.

According to a further embodiment, the second diameter can be less than an innermost diameter of the bottom cover bore.

According to a further embodiment, the housing can define a drain well recessed from the main cavity, the drain bore extending into the well.

According to a further embodiment, the gasket can include a backbone formed of a rigid material having a thickness that can be less than a thickness of the washer, the seal portion of the gasket being overmolded to the backbone.

Further areas of applicability will become apparent from the description and claims herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
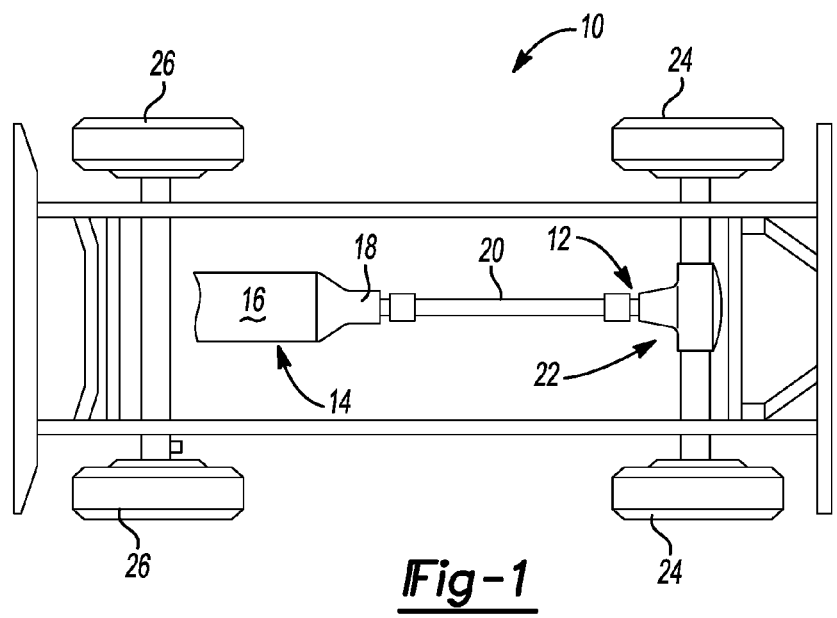
FIG. 1 is a schematic illustration of a motor vehicle equipped with an axle assembly constructed in accordance with the present teachings.

With reference to FIG. 1 of the drawings, a vehicle having an axle assembly that is constructed in accordance with the teachings of the present disclosure is generally indicated by reference numeral 10. The vehicle 10 can include a driveline 12 that can be drivable via a connection to a power train 14. The power train 14 can include an engine 16 and a transmission 18. The driveline 12 can include a propshaft 20, an axle assembly 22, and a plurality of wheels 24 and 26. In the example provided, the axle assembly 22 is a rear axle assembly configured to drive a set of rear wheels 24, though other configurations can be used. The engine 16 can be mounted in an in-line or longitudinal orientation along the axis of the vehicle 10, though other configurations can be used. The output of the engine 16 can be selectively coupled via a conventional clutch to the input of the transmission 18 to transmit rotary power (i.e., drive torque) therebetween. In the example provided, the input of the transmission 18 can be commonly aligned with the output of the engine 16 for rotation about a rotary axis. The transmission 18 can also include an output and a gear box having a plurality of drive ratios, such as in a manual, automatic transmission. Alternatively, the transmission 18 can be a continuously variable transmission. The gear box can be operable for coupling the transmission input to the transmission output at a predetermined gear speed ratio. The propshaft 20 can be coupled for rotation with the output of the transmission 18. Drive torque can be transmitted through the propshaft 20 to the rear axle assembly 22 where it can be apportioned to the left and the right wheels 24.

Figure 2:
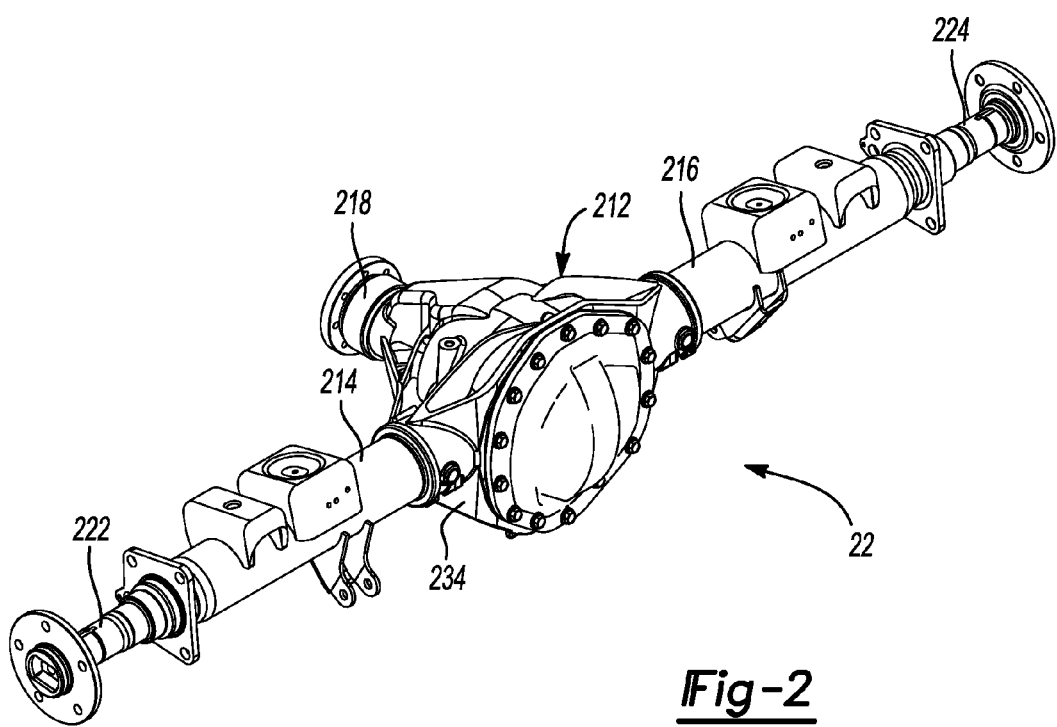
FIG. 2 is a perspective view of the axle assembly of FIG. 1.
Figure 3:
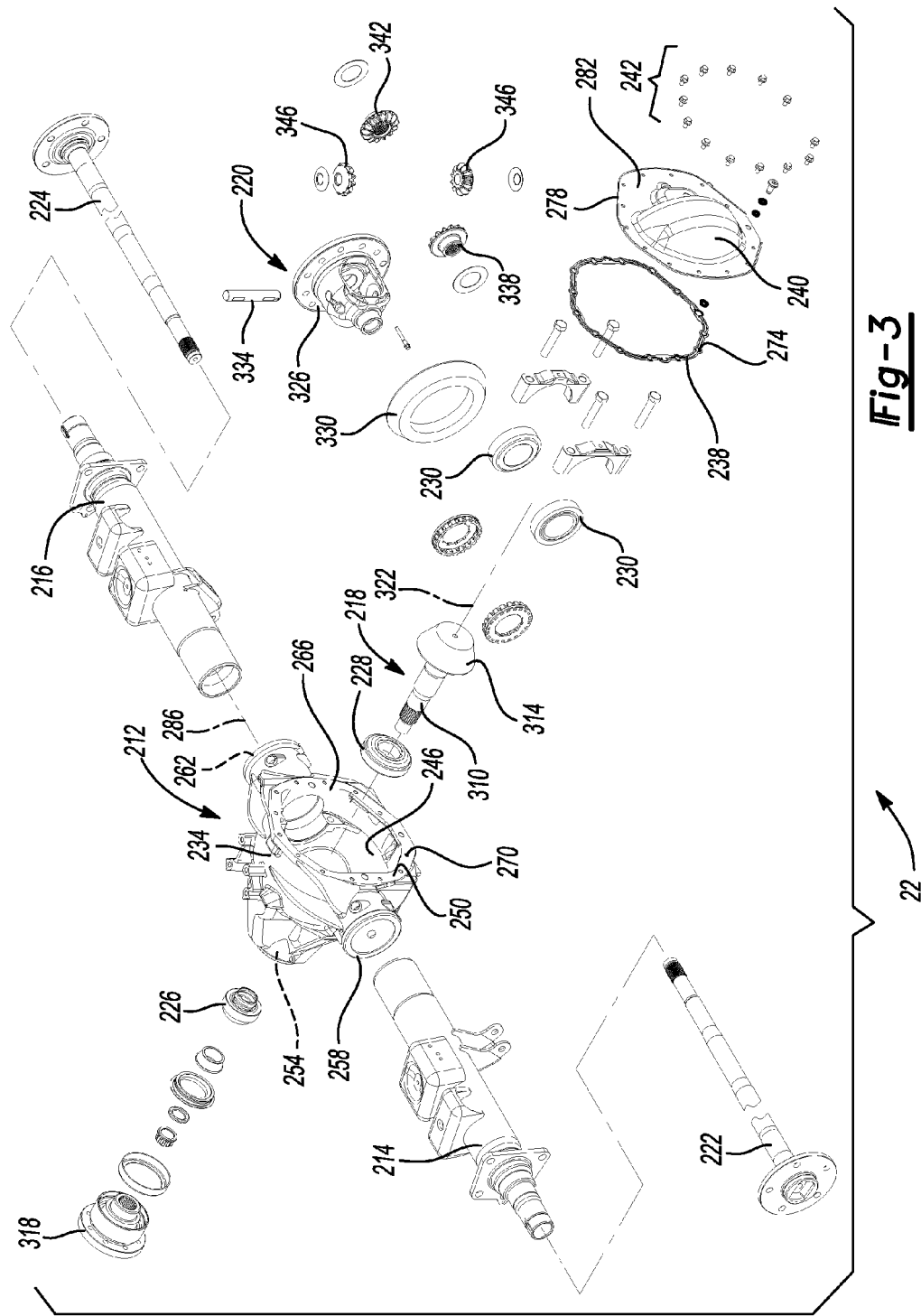
FIG. 3 is an exploded perspective view of the axle assembly of FIG. 2.

With additional reference to FIGS. 2 and 3, the axle assembly 22 is illustrated in greater detail. The axle assembly 22 can include a housing assembly 212, a first axle tube 214, a second axle tube 216, an input pinion 218, a differential assembly 220, a first output member 222, a second output member 224, a tail bearing 226, a head bearing 228, and a pair of differential bearings 230.

The housing assembly 212 can include a main body 234, a gasket 238, a cover body 240, and a plurality of fasteners 242. The main body 234 can be formed of a rigid material (e.g., steel). The main body 234 can define an inner cavity 246 and a main flange 250. In the example provided, a front side of the main body 234 can include an input aperture 254, a left side of the main body 234 can include a first output aperture 258, a right side of the main body 234 can include a second output aperture 262, and a rear side of the main body 234 can include a main aperture or differential aperture 266. The input aperture 254, the first output aperture 258, the second output aperture 262, and the differential aperture 266 can be open through the main body 234 between the inner cavity 246 and an exterior of the main body 234. The main flange 250 can define the perimeter of the differential aperture 266 and can include a plurality of threaded bores 270 spaced about the differential aperture 266.

The gasket 238 can have a plurality of gasket bores 274 that align with the threaded bores 270 of the main flange 250. The cover body 240 can span across the differential aperture 266 to cover the differential aperture 266. The cover body 240 can be formed of a rigid material (e.g., steel). The cover body 240 can have a cover flange 278 that can generally define the perimeter of the cover body 240. The cover flange 278 can include a plurality of cover bores 282 that align with the threaded bores 270 of the main flange 250. The fasteners 242 can be threaded fasteners that can be received through the cover bores 282 of the cover flange 278 and the gasket bores 274 to be threaded into the threaded bores 270 of the main flange 250. The gasket 238 can be located between and in contact with the main flange 250 and the cover flange 278 and can be compressed between the main flange 250 and the cover flange 278 to form a seal therebetween. The gasket 238 and main body 234 are described in greater detail below.

The first axle tube 214 can be fixedly attached to the main body 234 at the first output aperture 258 and can be coaxial with the first output aperture 258. The first output member 222 can be disposed within the first axle tube 214 and supported therein for rotation about an output axis 286. An inboard end of the first output member 222 can extend into the inner cavity 246. An outboard end of the first output member 222 can extend outward of an outboard end of the first axle tube 214 and can be drivingly coupled to a corresponding one of the wheels 24 (FIG. 1).

The second axle tube 216 can be fixedly attached to the main body 234 at the second output aperture 262 and can be coaxial with the second output aperture 262. The second output member 222 can be disposed within the second axle tube 216 and supported therein for rotation about the output axis 286. An inboard end of the second output member 224 can extend into the inner cavity 246. An outboard end of the second output member 224 can extend outward of an outboard end of the second axle tube 216 and can be drivingly coupled to a corresponding one of the wheels 24 (FIG. 1).

The input pinion 218 can include a pinion shaft 310, a pinion gear 314, and an input flange 318. The pinion shaft 310 can extend through the input aperture 254. The input flange 318 can be fixedly mounted to one end of the pinion shaft 310 and disposed external of the main body 234. The pinion gear 314 can be fixedly coupled to the other end of the pinion shaft 310 and disposed within the inner cavity 246. The pinion shaft 310 can be supported for rotation about an input axis 322 by the tail bearing 226 proximate to the input flange 318, and the head bearing 228 proximate to the pinion gear 314. The input axis 322 can be transverse to the output axis 286. In the example provided, the pinion gear 314 is a hypoid gear and the input axis 322 is perpendicular to and offset from the output axis 286.

The differential assembly 220 can be any suitable type of differential configured to receive input torque from the input pinion 218 and output differential output torque to the first and second output members 222, 224. In the example provided, the differential assembly 220 includes an open differential that includes a differential case 326, a ring gear 330, a cross-pin 334, a first side gear 338, a second side gear 342, and a pair of differential pinions 346. The differential case 326 can be supported within the inner cavity 246 of the main body 234 for rotation relative to the main body 234, such as by the differential bearings 230. The ring gear 330 can be fixedly coupled to the differential case 326 for common rotation about the output axis 286, such as by welding or fasteners for example.

The cross-pin 334 can be mounted to the differential case 326 for common rotation about the output axis 286. The cross-pin 334 can extend through the interior of the differential case 326 such that the longitudinal axis of the cross-pin 334 is perpendicular to the output axis 286. The differential pinions 346 can be located within the differential case 326 and can be disposed about opposite axial sides of the cross-pin 334, such that the differential pinions 346 are mounted within the differential case 326 for common rotation about the output axis 286, while being rotatable relative to the differential case 326 about the longitudinal axis of the cross-pin 334. The first and second side gears 338, 342 can be mounted within the differential case 326, on opposite axial sides of the differential case 326, for rotation relative to the differential case 326 about the output axis 286. The first side gear 338 can be meshingly engaged with both of the differential pinions 346 and the second side gear 342 can be meshingly engaged with both of the differential pinions 346. The inboard end of the first output member 222 can be non-rotatably coupled to the first side gear 338 for common rotation about the output axis 286. The inboard end of the second output member 224 can be non-rotatably coupled to the second side gear 342 for common rotation about the output axis 286.

Figure 4:
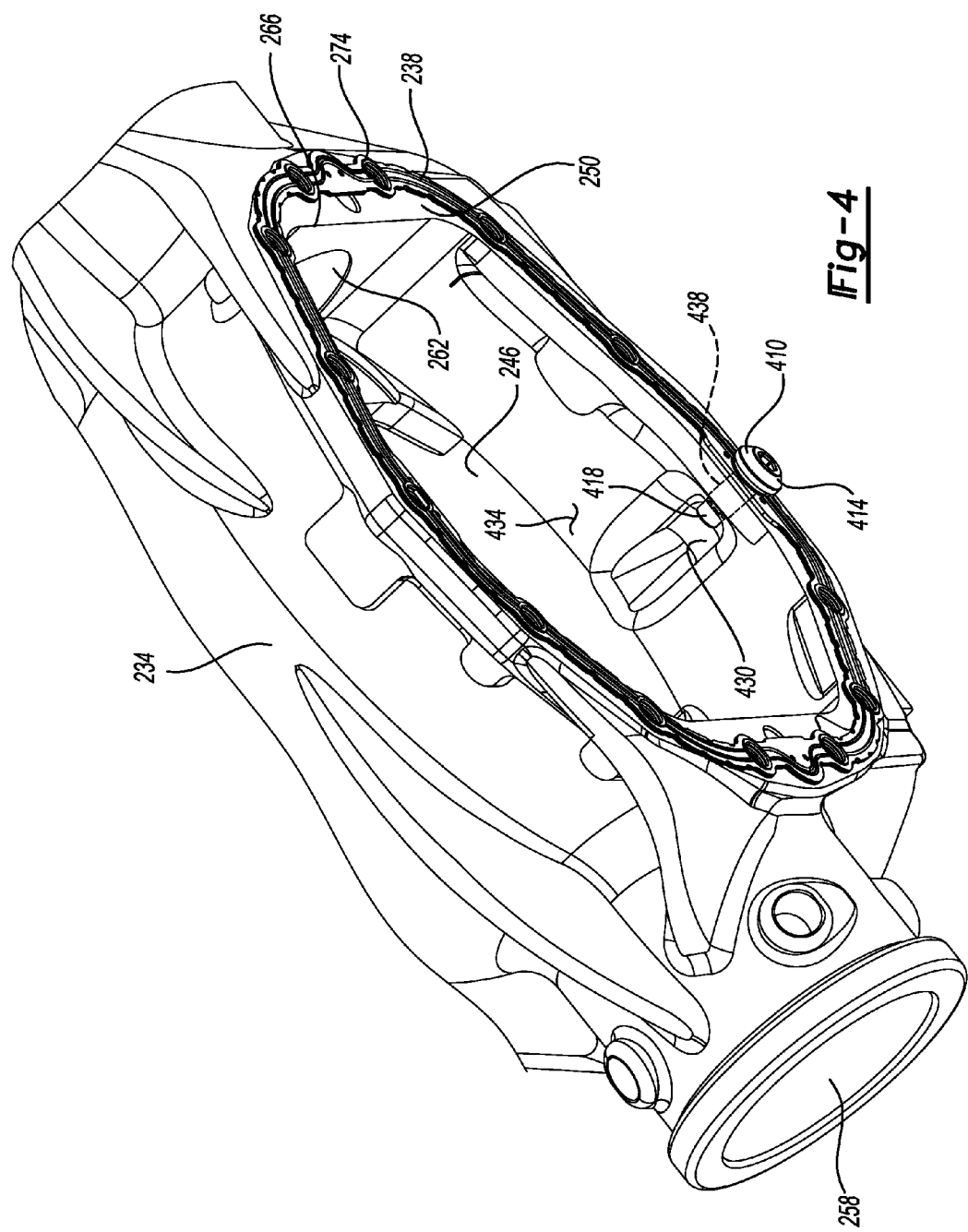
FIG. 4 is a partially exploded perspective view of a portion of the rear axle assembly of FIG. 2.

With additional reference to FIG. 4, the main body 234, the gasket 238, and a drain plug 410 are illustrated. The drain plug 410 can be one of the fasteners 242 (FIGS. 2 and 3) and can be a bottom one or the bottom-most one of the fasteners 242 (FIGS. 2 and 3) such that the drain plug 410 is proximate to a bottom of the main body 234 (i.e., proximate to the ground when the housing assembly 212 is assembled on the vehicle 10 (FIG. 1)). The drain plug 410 can be the same size as the other ones of the fasteners 242, though other configurations can be used. For example, the drain plug 410 can be a larger or a smaller size threaded fastener than the other ones of the fasteners 242. The drain plug 410 can be a bolt with a head 414 configured to be engaged by a tool (e.g., a wrench or socket) at a first end and a shaft 418 fixedly coupled to the head 414 and extending therefrom to a second, opposite end. The shaft 418 can have a threaded portion 422 (FIG. 5) proximate to the second end, and a non-threaded portion 426 (FIG. 5) between the threaded portion 422 (FIG. 5) and the head 414. The main body 234 can define a drain well 430 proximate to the bottom of main body 234. The drain well 430 can be recessed into a bottom surface 434 of the inner cavity 246 to extend below the bottom surface 434. The drain well 430 can be open generally upward into the inner cavity 246, such that the drain well 430 is in fluid communication with the inner cavity 246.

A bottom one, or in the example provided, a bottom-most one of the threaded bores 270 can be a drain bore 438 configured to threadably mate with the threaded portion 422 of the drain plug 410. The drain bore 438 can extend through the main flange 250 and be open into the drain well 430. When the cover body 240 (FIGS. 2 and 3) is mounted to the main body 234, the gasket 238 forms a seal to prevent fluid leakage between the main flange 250 and the cover flange 278 (FIG. 3), and removal of the drain plug 410 from the drain bore 438 can permit fluid communication between the drain well 430 and the exterior of the housing assembly 212 through the drain bore 438 and a corresponding one of the cover bores 282 (FIG. 3) of the cover body 240 (FIGS. 2 and 3). Thus, the drain plug 410 can serve to mount the cover body 240 (FIGS. 2 and 3) to the main body 234, while also permitting fluid to be drained from the inner cavity 246 without removing the cover body 240 or requiring an additional drain plug and drain bore, separate from the mounting fasteners 242.

Figure 5:
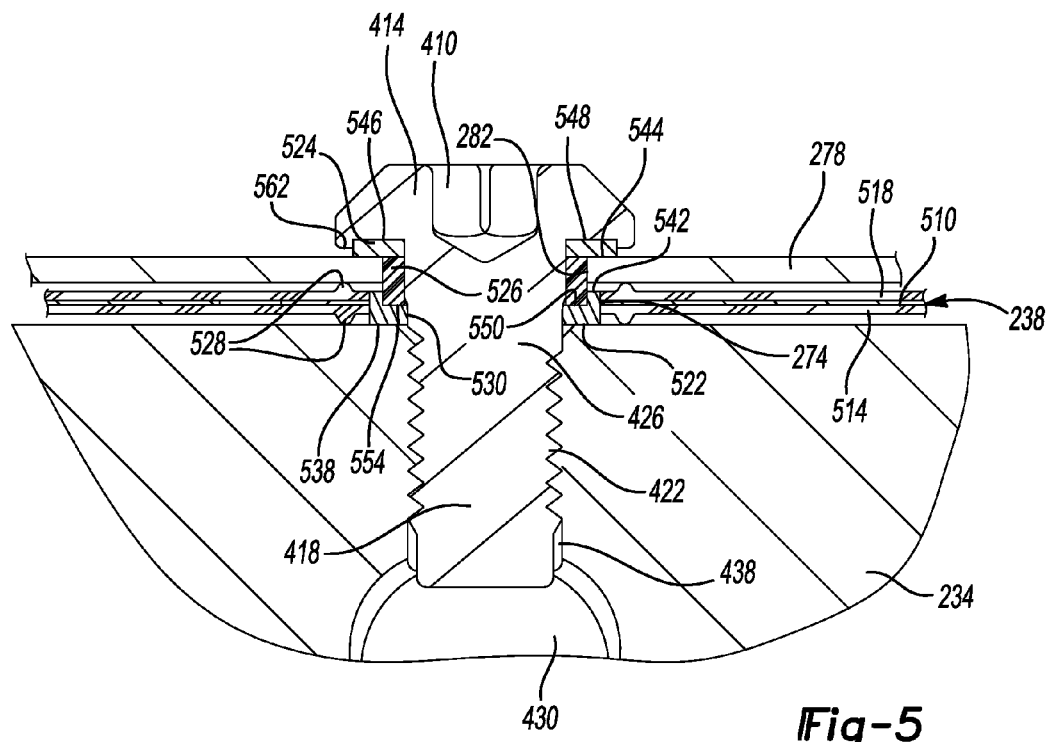
FIG. 5 is a sectional view of a portion of the axle assembly of FIG. 2, illustrating a gasket and drain plug of a first construction.

With additional reference to FIG. 5, a sectional view through the drain bore 438 is illustrated with the drain plug 410, gasket 238, and cover body 240 mounted to the main body 234. In the example provided, the gasket 238 can include a backbone 510, an inner seal portion 514, an outer seal portion 518, a standoff 522, a first fastener seal member 524, and a second fastener seal member 526. The backbone 510 can be a flat, annular body that generally corresponds to the shape of the main flange 250 and includes bores that correspond to each threaded bore 270 of the main flange 250 and form a part of each gasket bore 274 including the drain bore 438. In the example provided, the backbone 510 is a rigid material (e.g., metal) that can maintain the overall annular shape of the gasket 238.

The inner seal portion 514 can be a resilient material (e.g., rubber or polymer) that can be overmolded on the backbone 510, such that the inner seal portion 514 is on an inner side of the backbone 510, between the backbone 510 and the main flange 250, to contact and seal with the main flange 250. The inner seal portion 514 can define bores that form a part of each gasket bore 274 including the drain bore 438. The outer seal portion 518 can be a resilient material (e.g., rubber or polymer) that can be overmolded on the backbone 510, such that the outer seal portion 518 is on an outer side of the backbone 510, between the backbone 510 and the cover flange 278, to contact and seal with the cover flange 278. The outer seal portion 518 can define bores that form a part of each gasket bore 274 including the drain bore 438. The inner and outer seal portions 514, 518 can be formed of a single overmolding of the backbone 510 and can be joined on an inner and/or outer periphery of the backbone 510. The inner and outer seal portions 514, 518 can have ridges 528 that extend around in a generally circumferential direction of the annular gasket 238 (i.e., around the cover flange 278). The ridges 528 can also extend completely around each gasket bore 274.

The standoff 522 can be formed of a rigid material (e.g., metal) and can have an annular shape that can be coaxial with a bottom one of the gasket bores 274 that corresponds to the drain bore 438. The standoff 522 can have an outer diameter received within the gasket bore 274 that corresponds to the drain bore 438, and a standoff bore 530 having an inner diameter configured to receive the threaded portion 422 and the non-threaded portion 426 of the drain plug 410 through the standoff 522. The outer diameter can be greater than the diameter of a bottom one of the cover bores 282 that corresponds to the drain bore 438. The standoff 522 can have an inner surface 538 that can contact with the main flange 250, an outer surface 542 that can contact with the cover flange 278. A thickness between the inner surface 538 and the outer surface 542 of the standoff 522 can be thicker than a thickness of the backbone 510, such that when the drain plug 410 is tightened to clamp the cover flange 278 toward the main flange 250, the standoff 522 can prevent over compression of the inner and outer seal portions 514, 518 proximate to the drain bore 438. Alternatively, the standoff 522 can be integrally formed with the backbone 510 such that the backbone 510 and standoff 522 are a unitary body overmolded by the inner and outer seal portions 514, 518.

The first fastener seal member 524 can be formed of a resilient material (e.g., rubber or polymer) and can have an annular shape. The first fastener seal member 524 can have an inner diameter that can receive the threaded portion 422 and non-threaded portion 426 of the drain plug 410 therethrough. The inner diameter of the first fastener seal member 524 can form a seal with the non-threaded portion 426 of the drain plug 410. The first fastener seal member 524 can have an outer diameter that can be greater than the cover bore 282. An inner surface 544 of the first fastener seal member 524 can contact and form a seal with the outer surface of the cover flange 278. An outer surface 546 of the first fastener seal member 524 can form a seal with an inner surface 562 of the head 414. In the example provided, the first fastener seal member 524 is received in a circumferential groove 548 in the inner surface 562 of the head 414 and can extend axially outward from the circumferential groove 548 when in an uncompressed state, such that when the drain plug 410 is tightened, the inner surface 562 of the head 414 can compress the first fastener seal member 524 against the outer surface of the cover flange 278. While illustrated in a pre-tightened state, the inner surface 562 of the head 414 can also contact the outer surface of the cover flange 278 to retain the cover body 240 and compress the inner and outer portions 514, 518 of the gasket 238.

The second fastener seal member 526 can be formed of a resilient material (e.g., rubber or polymer) and can have an annular shape. The second fastener seal member 526 can have an inner diameter that can receive the threaded portion 422 and non-threaded portion 426 of the drain plug 410 therethrough, and can form a seal with the non-threaded portion 426. The second fastener seal member 526 can have an outer diameter that can be received within the cover bore 282. An inner surface 554 of the second fastener seal member 526 can contact and form a seal with the outer surface 542 of the standoff 522. In the example provided, the outer diameter of the second fastener seal member 526 is also such that the second fastener seal member 526 can be received in an annular recess 550 in the outer surface 542 of the standoff 522. An outer surface of the second fastener seal member 526 can extend axially outward through the cover flange 278 when in an uncompressed state, such that when the drain plug 410 is tightened, the inner surface of the first fastener seal member 524 or the inner surface 562 of the head 414 of the drain plug 410 can contact, compress, and form a seal with the outer surface of the second fastener seal member 526.

Figure 6:
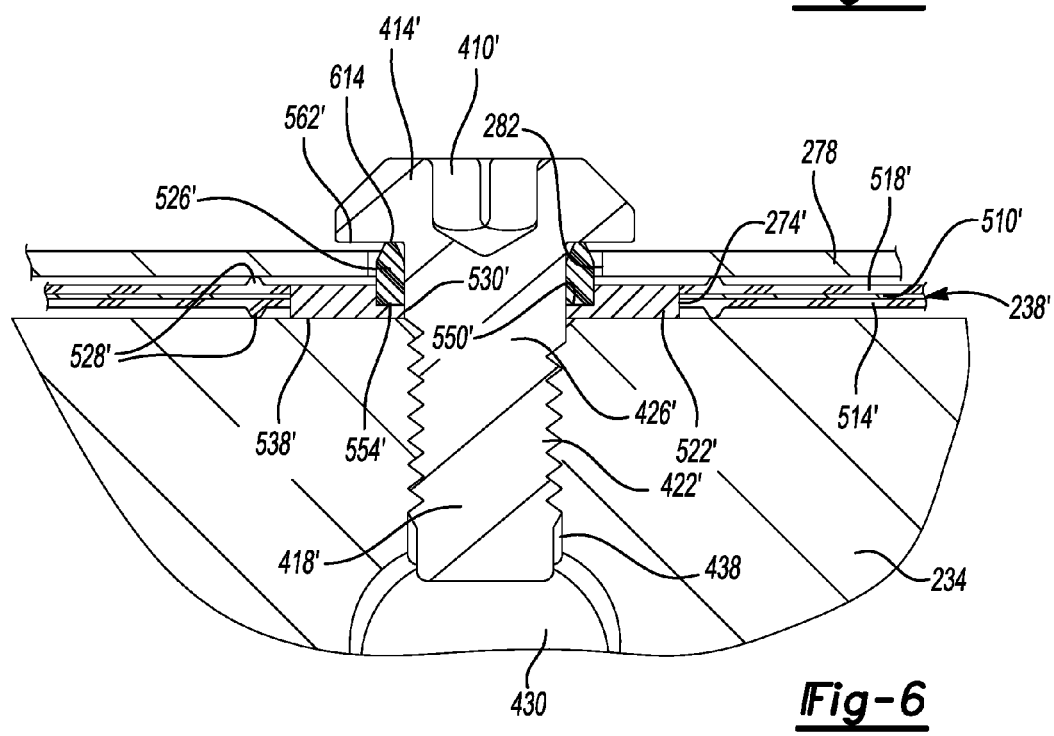
FIG. 6 is a sectional view similar to FIG. 5, illustrating a gasket and drain plug of a second construction.

With additional reference to FIG. 6, a cross-sectional view similar to FIG. 5 illustrates a gasket and drain plug of a second construction, indicated respectively with reference numerals 238' and 410'. The drain plug 410' can be similar to the drain plug 410 discussed above except as otherwise shown or described herein. The gasket 238' can have a backbone 510', an inner seal portion 514', an outer seal portion 518', a standoff 522', and a fastener seal member 526' that can be similar to the backbone 510, the inner seal portion 514, the outer seal portion 518, the standoff 522, and the second fastener seal member 526, respectively, described above except as otherwise shown or described herein. The standoff 522' can include an annular recess 550' that is recessed from the outer surface 542' of the standoff 522'. The annular recess 550' can be coaxial with the inner diameter of the standoff 522' and can be open to the inner diameter of the standoff 522'. In other words, an outermost diameter of the annular recess 550' can define the innermost diameter of the outer surface 542', such that the annular recess 550' is radially between the outer surface 542 and the non-threaded portion 426' of the drain plug 410'. The outermost diameter of the annular recess 550' can be less than the diameter of the cover bore 282 that corresponds to the drain bore 438.

The fastener seal member 526' can be formed of a resilient material (e.g., rubber or polymer) and can have an annular shape. The fastener seal member 526' can have an inner diameter that can receive the threaded portion 422' and non-threaded portion 426' of the drain plug 410' therethrough, and can form a seal with the non-threaded portion 426'. The fastener seal member 526' can have an outer diameter that can be received within the annular recess 550' of the standoff 522'. An inner surface 554' of the fastener seal member 526' can contact and form a seal with the annular recess 550'. An outer surface 558' of the fastener seal member 526' can extend axially outward from the cover flange 278 when in an uncompressed state, such that when the drain plug 410' is tightened, the inner surface 562' of the head 414' of the drain plug 410' can contact, compress, and form a seal with the outer surface 558' of the fastener seal member 526'. In the example provided, the outer surface 558' of the fastener seal member 526' generally narrows to form a peak 614 that contacts the inner surface 562' of the head 414', though other configurations can be used. In other words, an annular thickness of the fastener seal member 526' can narrow toward the outer side. While illustrated in a pre-tightened state, the inner surface 562' of the head 414' can also contact the outer surface of the cover flange 278 to retain the cover body 240 and compress the inner and outer portions 514', 518' of the gasket 238'.

Figure 7:
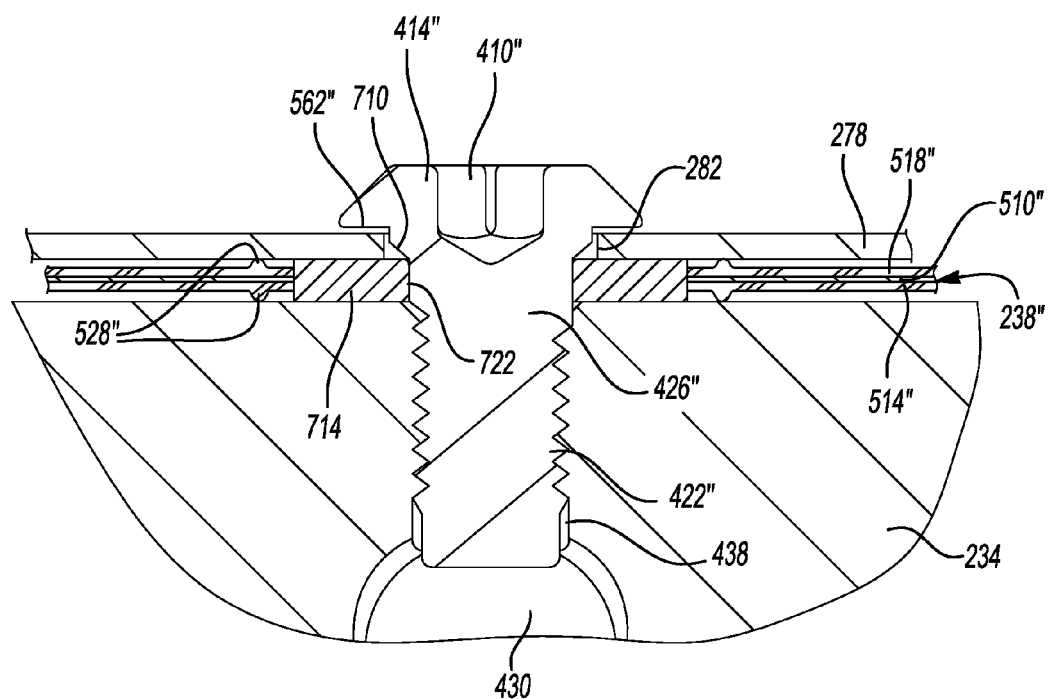
FIG. 7 is a sectional view similar to FIG. 5, illustrating a gasket and drain plug of a third construction.

With additional reference to FIG. 7, a cross-sectional view similar to FIG. 5 illustrates a gasket and a drain plug of a third construction, indicated respectively with reference numerals 238" and 410". The drain plug 410" can be similar to the drain plug 410 described above except as otherwise shown or described herein. The drain plug 410" can have a threaded portion 422", a non-threaded portion 426", and a head 414" that can be similar to the threaded portion 422, non-threaded portion 426, and head 414 discussed above except as otherwise shown or described herein. In the example provided, the drain plug 410" also includes a sealing or tapered portion 710 between the non-threaded portion 426" and the head 414". The tapered portion 710 has a first diameter proximate to the head 414" and a second diameter proximate to the non-threaded portion 426". The first diameter is greater than the second diameter, such that the tapered portion 710 narrows toward the non-threaded portion 426" at an angle. In other words, the tapered portion 710 can be generally frusto-conical in shape.

The gasket 238" can be similar to the gasket 238 and 238' except as otherwise shown or described herein. The gasket 238" can include a backbone 510", an inner seal portion 514", an outer seal portion 518" that can be similar to the backbone 510, 510', the inner seal portion 514, 514', and the outer seal portion 518, 518', respectively, except as otherwise shown or described herein. In the example provided in FIG. 7, the gasket 238" does not include the standoff 522 (FIG. 5) and second fastener seal member 526 (FIG. 5), but instead includes a washer 714 formed of a semi-rigid material that is more rigid than the inner or outer seal portions 514', 518' while being more ductile than the drain plug 410 (e.g., a metal softer than the cover body 240, the main body 238, and the drain plug 410, but harder than the resilient inner or outer seal portions 514', 518').

The washer 714 can have an annular shape having an outer diameter that is greater than the diameter of the cover bore 282 that corresponds to the drain bore 438. The washer 714 can have a washer bore 722 that has an inner diameter that can receive the threaded portion 422" and the non-threaded portion 426" of the drain plug 410" therethrough. The inner diameter of the washer bore 722 can be smaller than the widest part of the tapered portion 710. The washer 714 can be disposed axially between the main body 234 and the cover body 240. While illustrated in a pre-tightened position, when the drain plug 410" is tightened in the drain bore 438, the tapered portion 710 can contact and compress the washer 714 to form a seal therebetween and can compress the washer 714 against the main flange 250 to form a seal therebetween. When tightened, the inner surface 562" of the head 414" can also contact the outer surface of the cover flange 278 to retain the cover body 240 and compress the inner and outer seal portions 514", 518" of the gasket 238". Thus, the washer 714 can act as a standoff and as the fastener seal member.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An axle assembly comprising:
    a housing defining a main cavity, the housing including a first output aperture, a second output aperture, and a main flange that defines a main aperture that is open to the main cavity, the main flange including a plurality of threaded bores spaced about the main aperture and configured to threadably mate with a plurality of threaded fasteners, a bottom one of the threaded bores being a drain bore that extends through the main flange to be in fluid communication with the main cavity;
    an input member rotatable relative to the housing about a first axis;
    a first output member and a second output member, the first and second output members being supported for rotation relative to the housing about a second axis, the first output member extending through the first output aperture, the second output member extending through the second output aperture;
    a differential assembly disposed within the main cavity and including a differential gear set drivingly coupled to the input member to receive rotary power therefrom and drivingly coupled to the first and second output members to output differential rotary power thereto;
    a drain plug including a shaft and a head fixedly coupled to an end of the shaft and extending radially outward of the shaft, the shaft including a threaded portion defining a plurality of threads that matingly engage the threads of the drain bore;
    a cover body that covers the main aperture, the cover body including a cover flange that defines a plurality of cover bores, the cover bores aligning with the plurality of threaded bores, a bottom one of the cover bores being a bottom cover bore that is aligned with the drain bore, the shaft of the drain plug extending through the bottom cover bore, the head of the drain plug extending radially outward of the bottom cover bore to overlap the cover flange; and
    a gasket including:
        a seal portion including a plurality of gasket bores that align with the plurality of threaded bores, a bottom one of the gasket bores being a bottom gasket bore and aligning with the drain bore, the seal portion being a resilient material configured to be compressed between the main flange and the cover flange to form a seal therebetween;
        a standoff member defining a standoff bore aligned with the bottom gasket bore, the shaft of the drain plug extending through the standoff bore, the standoff being a rigid material disposed between the main flange and the cover flange and extending radially outward of the drain bore and the bottom cover bore; and
        a fastener seal member formed of a resilient material and in sealing contact with the standoff, the shaft of the drain plug extending through and in sealing contact with a central bore of the fastener seal member.

2. The axle assembly of claim 1, wherein the fastener seal member has an outermost diameter that is less than an innermost diameter of the bottom gasket bore.

3. The axle assembly of claim 1, wherein an innermost diameter of the fastener seal member is less than an outer diameter of the shaft of the drain plug.

4. The axle assembly of claim 1, wherein the fastener seal member extends axially through at least a portion of the bottom cover bore.

5. The axle assembly of claim 4, wherein the fastener seal member is in sealing contact with the head of the drain plug.

6. The axle assembly of claim 4, wherein a portion of the fastener seal member has an annular thickness that narrows toward the outer side.

7. The axle assembly of claim 1, wherein the standoff includes a recess that is coaxial with the standoff bore, the fastener seal member being partially disposed within the recess.

8. The axle assembly of claim 1, wherein the shaft of the drain plug includes a non-threaded portion and the fastener seal member sealingly contacts the non-threaded portion of the shaft.

9. The axle assembly of claim 1, wherein the housing defines a drain well recessed from the main cavity, the drain bore extending into the well.

10. The axle assembly of claim 1, wherein the gasket further includes an annular second fastener seal member disposed axially between the head of the drain plug and the cover flange, the shaft of the drain plug extending through a central bore of the second fastener seal member, an outermost diameter of the second fastener seal member being radially outward of the bottom cover bore.

11. The axle assembly of claim 1, wherein the gasket includes a backbone formed of a rigid material having a thickness that is less than a thickness of the standoff, the seal portion of the gasket being overmolded to the backbone.

12. An axle assembly comprising:
a housing defining a main cavity, the housing including a first output aperture, a second output aperture, and a main flange that defines a main aperture that opens to the main cavity, the main flange including a plurality of threaded bores spaced about the main aperture and configured to threadably mate with a plurality of threaded fasteners, a bottom one of the threaded bores being a drain bore that extends through the main flange to be in fluid communication with the main cavity;
an input member rotatable relative to the housing about a first axis;
a first output member and a second output member, the first and second output members being supported for rotation relative to the housing about a second axis, the first output member extending through the first output aperture, the second output member extending through the second output aperture;
a differential assembly disposed within the main cavity and including a differential gear set drivingly coupled to the input member to receive rotary power therefrom and drivingly coupled to the first and second output members to output differential rotary power thereto;
a drain plug including a shaft and a head fixedly coupled to an end of the shaft and extending radially outward of the shaft, the shaft including a threaded portion and a non-threaded portion, the threaded portion defining a plurality of threads that matingly engage the threads of the drain bore, the non-threaded portion being radially outward of the threads;
a cover body covering the main aperture and including a cover flange that defines a plurality of cover bores, the cover bores aligning with the plurality of threaded bores, a bottom one of the cover bores being a bottom cover bore that is aligned with the drain bore, the shaft of the drain plug extending through the bottom cover bore, the head of the drain plug extending radially outward of the bottom cover bore to overlap the cover flange;
a gasket including:
a seal portion including a plurality of gasket bores that align with the plurality of threaded bores, a bottom one of the gasket bores being a bottom gasket bore and aligning with the drain bore, the seal portion of the gasket being a resilient material configured to be compressed between the main flange and the cover flange to form a seal therebetween; and
an annular washer coaxial with the bottom gasket bore, the washer being disposed between the main flange and the cover flange and extending radially outward of the bottom cover bore and the drain bore, the washer being a material that is more rigid than the seal portion and more ductile than the drain plug, the washer being in sealing contact with the non-threaded portion of the drain plug and the main flange.

13. The axle assembly of claim 12, wherein the washer has an inner diameter that is less than a diameter of the non-threaded portion of the drain plug.

14. The axle assembly of claim 12, wherein the non-threaded portion of the drain plug is tapered from a first diameter proximate to the threaded portion to a second diameter proximate to the head, the second diameter being greater than the first diameter, wherein the first diameter is less than an inner diameter of the washer and the second diameter is greater than the inner diameter of the washer.

15. The axle assembly of claim 14, wherein the second diameter is less than an innermost diameter of the bottom cover bore.

16. The axle assembly of claim 12, wherein the housing defines a drain well recessed from the main cavity, the drain bore extending into the well.

17. The axle assembly of claim 12, wherein the gasket includes a backbone formed of a rigid material having a thickness that is less than a thickness of the washer, the seal portion of the gasket being overmolded to the backbone.

* * * * *